United States Patent [19]

Wie

[11] 4,397,297
[45] Aug. 9, 1983

[54] WATER HEATER HEAT RECLAIMER

[76] Inventor: Chwang T. Wie, 7041 Yosemite, Lincoln, Nebr. 68507

[21] Appl. No.: 242,601

[22] Filed: Mar. 11, 1981

[51] Int. Cl.³ .............................................. F24H 1/00
[52] U.S. Cl. ..................................... 126/365; 122/17; 122/20 B; 237/19
[58] Field of Search .................. 122/17, 20 B; 237/19; 126/365

[56] References Cited

U.S. PATENT DOCUMENTS 2,521,461  9/1950  Kinzelmann ...................... 122/20 B Primary Examiner—Ronald C. Capossela

[57] ABSTRACT

This invention relates to the conservation of energy in a domestic gas water heater by utilizing the hot exhaust gases in a gas water heater for the preheating of the incoming unheated water into the water heater.

The exhaust gases from a domestic gas water heater carry wasted heat and the present invention provides a mean to reclaim part of the wasted heat for the preheating of the incoming unheated water during hot water usage periods. During non hot water usage periods the heat in the exhaust gases is not reclaimed to prevent overheating of the water and also to prevent the formation of water deposit in the preheating assembly or heat reclaimer. During the non hot water usage periods the heat produced in the water heater is normally needed only to maintain the desired water temperature of the stored water in the water tank of the water heater.

Due to the rapid heating or recovery rate, the present invention enables the use of a smaller water heater. The use of a smaller water heater reduces the normal heat loss from the stored hot water thereby further reduces energy consumption.

2 Claims, 1 Drawing Figure

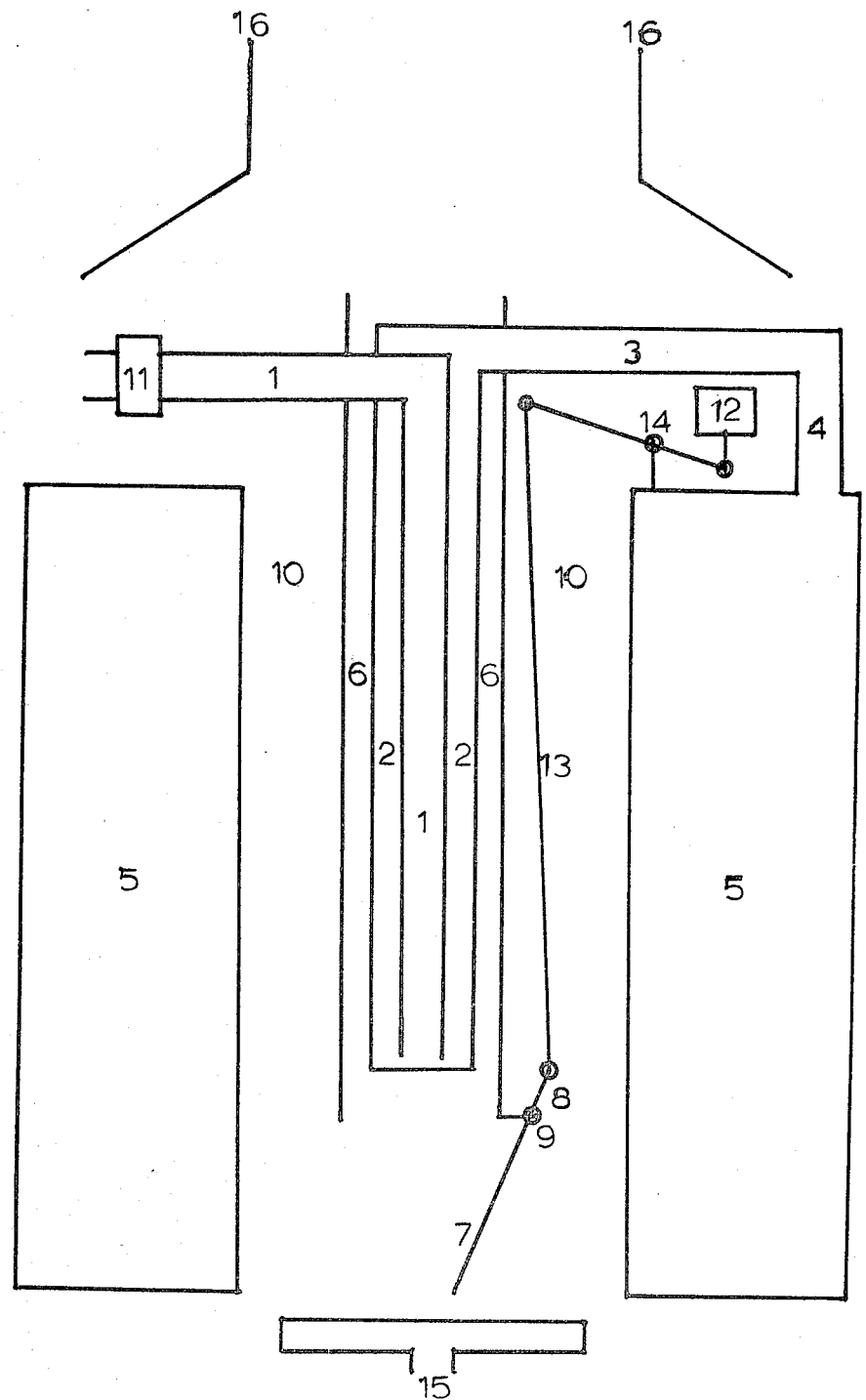

WATER HEATER HEAT RECLAIMER

It is an object of this invention to improve the efficiency of domestic gas water heaters.

Another object of this invention is to insure the adaptability of the invention to the current domestic gas water heaters.

A preferred example of the construction of a domestic gas water heater to achieve the forementioned objectives is presented below. The invention is used and built in a similar fashion as any existing domestic gas water heater. The construction is capable of variations without departing from the invention.

In the drawing: (Unproportionally illustrated)

The FIGURE is a diagram of the vertical cross section of a domestic gas water heater in accordance with the invention. The invention comprises of the followings:

a. A water inlet tube 1, which is a simple L shaped tube, through which cold water from the water main flows into the preheating tube 2. The section of the water inlet tube 1 which is inside the preheating tube 2 is constructed of an insulating material so that no significant heat transfer through the tube wall is possible. The horizontal section of the water inlet tube 1 is also insulated so that no significant heating of the water inside the section of the tube can be accomplished by hot flue exhaust gases.

b. A preheating tube 2, which is a straight tube slightly larger in diameter than the water inlet tube 1. The vertical section of the water inlet tube 1 is in the center of the preheating tube 2. The bottom of the preheating tube 2 is closed.

c. A preheated water outlet tube 3, which is a straight insulated tube. One end of the preheated water outlet tube 3 is opened to the top of the preheating tube 2. The other end is opened to the insulated inlet tube 4 of the water heater tank 5.

d. A water tank inlet tube 4, which is also insulated and direct preheated water into the water heater tank 5.

e. A water heater tank 5 where hot water is stored and drawn out for use. The hot water outlet is not shown.

f. An insulated heat shield 6 in the form of a cylindrical vessel. The botton cover 7 of the vessel is hinged to the bottom of the cylinder wall. The bottom cover 7 is opened or closed by pulling or pushing the bottom cover extension 8 on the other side of the hinge 9. The heat shield 6 is located in the center of the flue 10 of the water heater. The flue baffle of the water heater is cut to accommodate the heat shield 6 (the flue baffle is not illustrated in the drawing so that the basic construction can better be illustrated). The preheating tube 2 is located in the center of the heat shield 6. An air space is provided between the preheating tube 2 and the heat shield 6. The heat shield 6 prevents the heating of the preheating tube 2 during non appreciable or low water usage rate periods that is during periods when the bottom cover 7 is in its closed position.

g. A water flow switch 11 which is located on the water inlet tube 1. Any appreciable rates of water flow into the preheating tube 2 activates the switch 11. The switch 11 is deactivated or turned off as the water flow rate decreases sufficiently or stops.

h. An electrically operated selenoid 12, which is controlled by the water flow switch 11 (the wiring is simple and is not pertinent to the understanding of the invention. Therefore it is not illustrated). The selenoid 12 opens and closes the bottom cover 7 of the heat shield 6 by operating rod 13 through a selenoid linkage system 14. Rod 13 is pivoted to the bottom cover extension 8 of the bottom cover 7 of the heat shield 6. Any appreciable rates of water flow into the preheating tube 2 activates the switch 11 which in turn activates the selenoid 12 and opens the heat shield bottom cover 7. The switch 11 is deactivated as the water flow rates decrease sufficiently to below the activation point of the switch 11. At that point the selenoid 12 closes the heat shield bottom cover 7.

During any appreciable hot water usage rate periods, the flow of the unheated incoming water from the water main into the preheating tube 2 occurs through the water inlet tube 1. In so doing, the switch 11 and the selenoid 12 are activated and the heat shield bottom cover 7 opens exposing the preheating tube 2. The incoming water then flows upward in the preheating tube 2 and into the water heater tank 5. As the appreciable hot water usage rate continues, and as the water temperature in the water heater tank 5 drops below the desired temperature level, the burner 15 ignites. At this point, both the water heater tank 5 and the preheating tube 2 are simultaneously heated. The hot exhaust gases are exhausted into the draft diverter 16 through the flue 10 and the opening between the preheating tube 2 and the heat shield 6.

The hot exhaust gases that are exhausted through the opening between the preheating tube 2 and the heat shield 6 is the portion of the exhaust gases used for the preheating purposes. The remaining portion of the exhaust gases is used for the heating of the water in the water heater tank 5.

Any non appreciable flow rate of hot water out of the water heater either deactivates or does not activate the switch 11 and either closes or does not open the heat shield bottom cover 7. The feature is a safety feature to prevent overheating of the water in the preheating tube 2. During a non appreciable hot water usage rate period, the replacement rate of the preheated water in the preheating tube 2 by the incoming unheated water is relatively slow. The exposure time of the preheated water in the preheating tube 2 to the heat normally produced by the burner 15 is therefore extended. The overheating of the water in the preheating tube 2 can then result without the above safety feature. The feature also prevents the formation of water deposit on the wall of the preheating tube 2. Water deposit formation occurs during all normal heating of regular hard water. The presence of appreciable water flow through the preheating tube 2 during heat exposure significantly reduces the formation of the water deposit in the preheating tube 2 by flushing any deposit formed during heating out of the preheating tube 2. The formation of the water deposit on the wall of the preheating tube 2 reduces both the preheating efficiency and the hot water flow capacity.

During non hot water usage periods, the heat produced in the water heater is needed only to maintain the desired water temperature of the stored water in the water heater tank 5. The water present in the preheating tube 2 is not heated.

The activation point of the switch 11 is selected and set at a minimum flow rate of the unheated incoming water at which flow rate the outgoing preheated water from the preheating tube 2 is not excessively heated when exposed to the heat in the opened heat shield 6

(with heat shield bottom cover 7 opened) from an ignited burner 15. The activation point varies with the construction of the preheating tube 2, the air space between the preheating tube 2 and the heat shield 6, and the amount of heat produced by the burner 15. The activation point is similar to the deactivation point.

The maximum heating efficiency of the water in the preheating tube 2 is obtained when the distance between the vertical outside wall of the water inlet tube 1 and the vertical inside wall of the preheating tube 2 is at its minimum while the length and the diameter of the preheating tube 2 are at their maximum for a given water heater. The diameter of the preheating tube 2 and the distance between the vertical outside wall of the water inlet tube 1 and the vertical inside wall of the preheating tube 2 also determine the hot water flow capacity of the water heater. The wall of the preheating tube 2 can be finned or waved to increase surface area thereby increase the preheating efficiency.

The air space between the preheating tube 2 and the heat shield 6 is kept at its minimum so that no more than the necessary amounts of the hot exhaust gases passes through the air space for the preheating purposes. The remaining hot exhaust gases pass through the flue 10 for the heating of the water in the water tank 5. Large air space between the preheating tube 2 and the heat shield 6 can cause overheating of the water in the preheating tube 2 due to the overabundance of the hot exhaust gases exhausted through the air space. Consequently, the amount of hot exhaust gases exhausted through the flue 10 is reduced and causes a reduction in the heating of the water in the water tank 5 of the water heater.

What is claimed is as follow:

1. A water heating system comprising of the combination of a water heater tank exposed to a burner, a water preheating mean adapted to be only conditionally exposed to said burner, outlet and inlet conduits connecting said preheating mean with said water heater tank, and a controlled heat shield around said water preheating mean and operatively adapted to expose said preheating mean to said burner only during periods with appreciable hot water usage rate.

2. A water heating system comprising of the combination of a water heater tank exposed to a burner and the heat said burner normally produces, a water preheating mean adapted to deliver unheated incoming water and to conditionally expose said unheated water to said burner without any heat transfer from the preheated water to said unheated water, outlet and inlet conduits connecting said water heater tank with said water preheating mean and directing the flow of said unheated incoming water successively from the water main to the inlet conduit of said water preheating mean then to the outlet conduit of said water preheating mean then to the inlet conduit of said water heater tank and finally into said water heater tank ready for use, and a water flow rate controlled heat shield around said water preheating mean adapted to be located in the flue of said water heating system and operatively adapted to expose said water preheating mean to said burner only during periods with appreciable hot water usage rate, said preheating mean is adapted to be located in the center of said heat shield with the presence of an air space between said preheating mean and said heat shield.

* * * * *